(12) United States Patent
Codilian

(10) Patent No.: US 6,714,371 B1  
(45) Date of Patent: Mar. 30, 2004

(54) METHOD AND DISK DRIVE FOR SHOCK ESTIMATION AND WRITE TERMINATION CONTROL

(75) Inventor: Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 250 days.

(21) Appl. No.: 09/944,677

(22) Filed: Aug. 31, 2001

(51) Int. Cl.$^7$ .......................... G11B 15/04; G11B 19/04
(52) U.S. Cl. ........................................ 360/60; 360/77.05
(58) Field of Search ............................... 360/60, 77.02, 360/77.05

(56) References Cited

U.S. PATENT DOCUMENTS

| | | | |
|---|---|---|---|
| 6,018,431 A | * | 1/2000 | Carlson et al. ............... 360/60 |
| 6,049,442 A | * | 4/2000 | Fukushima et al. ...... 360/77.08 |
| 6,178,058 B1 | * | 1/2001 | Pan et al. ..................... 360/60 |
| 6,226,140 B1 | | 5/2001 | Serrano et al. |
| 6,313,964 B1 | * | 11/2001 | Lamberts et al. ............. 360/75 |
| 6,429,990 B2 | * | 8/2002 | Serrano et al. ............... 360/60 |

* cited by examiner

Primary Examiner—David Hudspeth
Assistant Examiner—Varsha A. Kapadia
(74) Attorney, Agent, or Firm—Milad G. Shara, Esq.; Robroy R. Fawcett, Esq.

(57) ABSTRACT

The invention relates to a technique for shock estimation and write termination control in a disk drive. During a data write operation, a selected track's embedded servo sectors are read to generate position error signal values. A write unsafe limit is provided for terminating a data write operation if at least one position error signal value exceeds the write unsafe limit. A shock event limit is provided, and if a current position error signal value is less than the write unsafe limit value, then a function value is calculated based on the current position error signal value and a previous position error signal value. If the calculated function value exceeds the shock event limit, a data write operation is terminated. Otherwise, the operation is continued.

16 Claims, 5 Drawing Sheets

METHOD AND DISK DRIVE FOR SHOCK ESTIMATION AND WRITE TERMINATION CONTROL

BACKGROUND OF THE INVENTION

1. Field of the Invention

The present invention relates to digital data storage, and more particularly, to techniques for estimating external shock and controlling write operations in a disk drive.

2. Description of the Prior Art

In order to remain competitive, disk drive manufacturers must continually provide increased data storage capacity while rigidly controlling disk drive manufacturing cost. One key to increased storage capacity is increased track density, often expressed as tracks per inch or TPI. Market demand for increased storage capacity has pushed disk drive designers to increase the TPI of disk drives, thereby increasing the likelihood that an external shock event may undesirably force the disk drive's read/write head over an adjacent track during track following.

Accordingly, there exists a need for a technique that enables a disk drive to minimize the effect of external shock during track following without unnecessarily increasing the disk drive's manufacturing cost.

SUMMARY OF THE INVENTION

The present invention may be embodied in a method for shock estimation and write termination control in a disk drive having a read/write head and a plurality of concentric data tracks on a storage surface of a rotating disk, each data track having data sectors and embedded servo sectors. In the method, the head is positioned over a selected data track of the plurality of concentric data tracks for following the track during a data write operation. The track's embedded servo sectors are read to generate position error signal values. A write unsafe limit is provided for terminating a data write operation if at least one position error signal value exceeds the write unsafe limit. A shock event limit is provided, and if a current position error signal value is less than the write unsafe limit value, then a function value is calculated based on the current position error signal value and a previous position error signal value. If the calculated function value exceeds the shock event limit, a data write operation is terminated.

In more detailed features of the invention, the calculated function value may be an addition of the current position error signal value and the previous position error signal value, or the calculated function value may be equal to twice the current position error signal value minus the previous position error signal value.

In another embodiment of the invention, a preliminary limit is provided that is smaller than the write unsafe limit. If at least one position error signal value exceeds the preliminary limit without exceeding the write unsafe limit, then a difference limit is provided and a difference is calculated between a current position error signal value and a previous position error signal value. If the calculated difference exceeds the difference limit, a data write operation is terminated.

In another embodiment of the invention, a difference limit and a preliminary limit are provided. The preliminary limit is smaller than the write unsafe limit. A difference is calculated between a current position error signal value and a previous position error signal value. A data write operation is terminated if the current position error signal value exceeds the preliminary limit and the calculated difference exceeds the difference limit.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
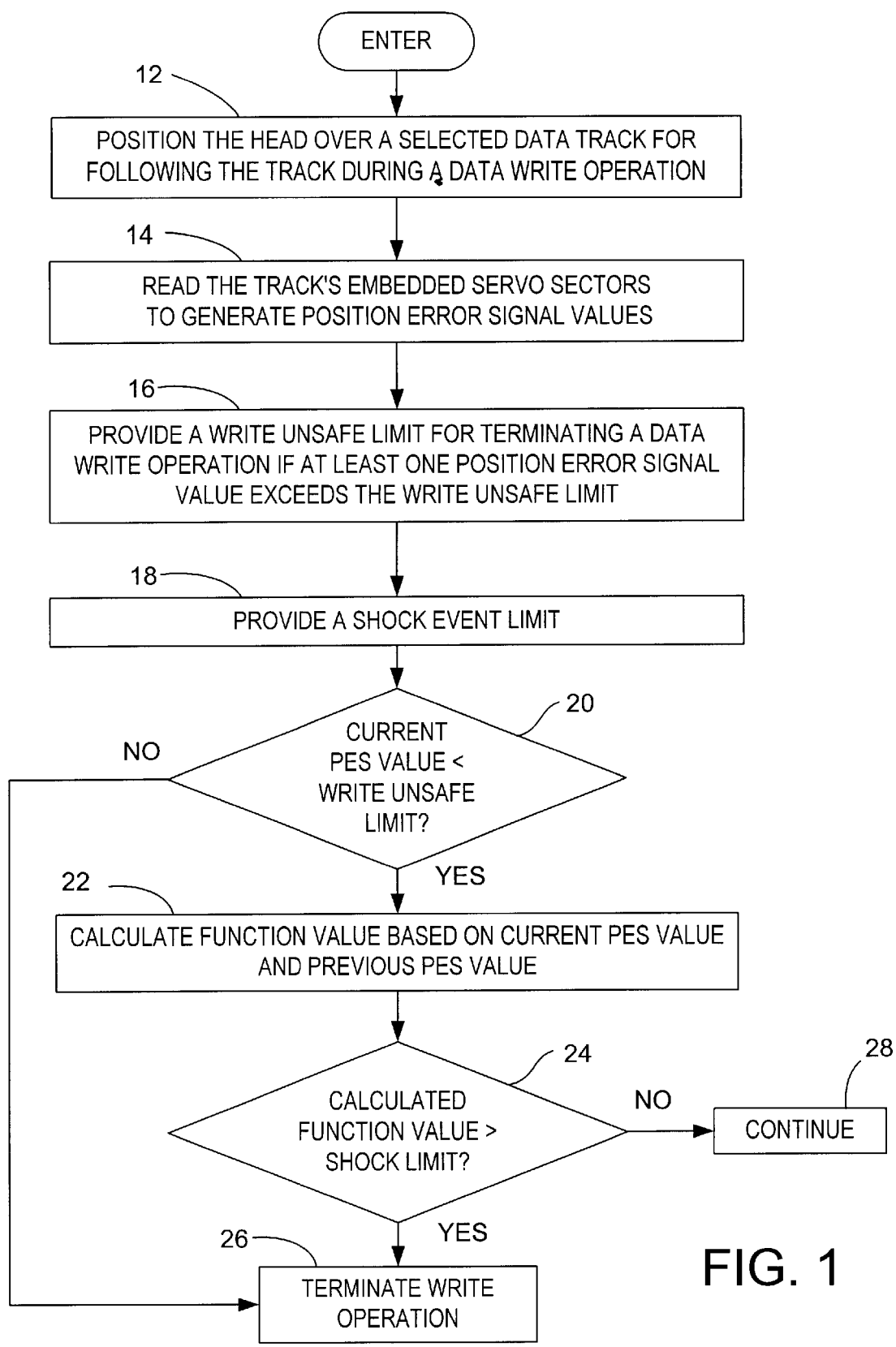
FIG. 1 is a flow diagram of a first embodiment of a method for shock estimation and write termination control in a disk drive, according to the present invention.
Figure 2:
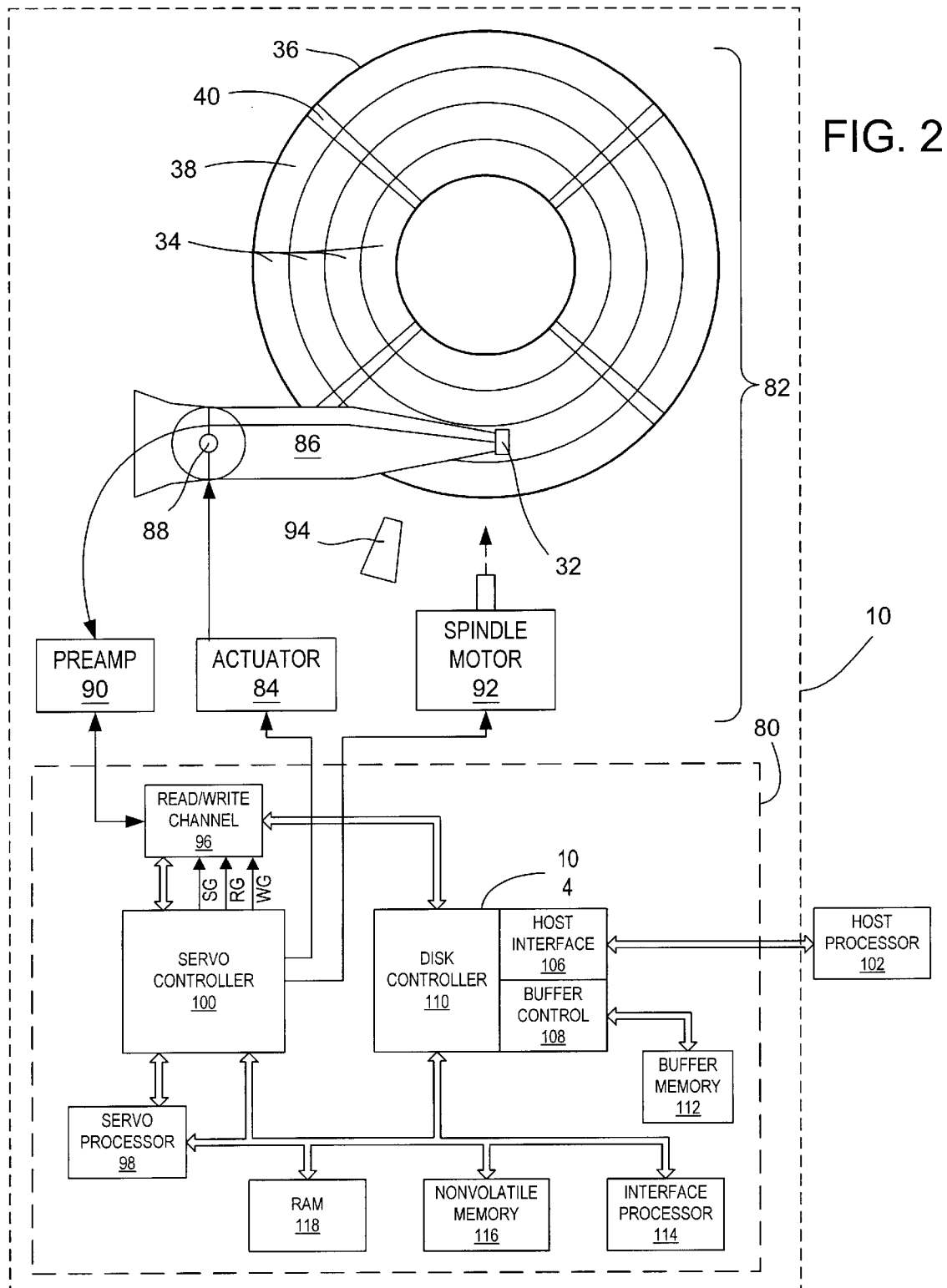
FIG. 2 is a block diagram showing a disk drive for implementing the shock estimation and write termination control methods of the present invention.
Figure 3:
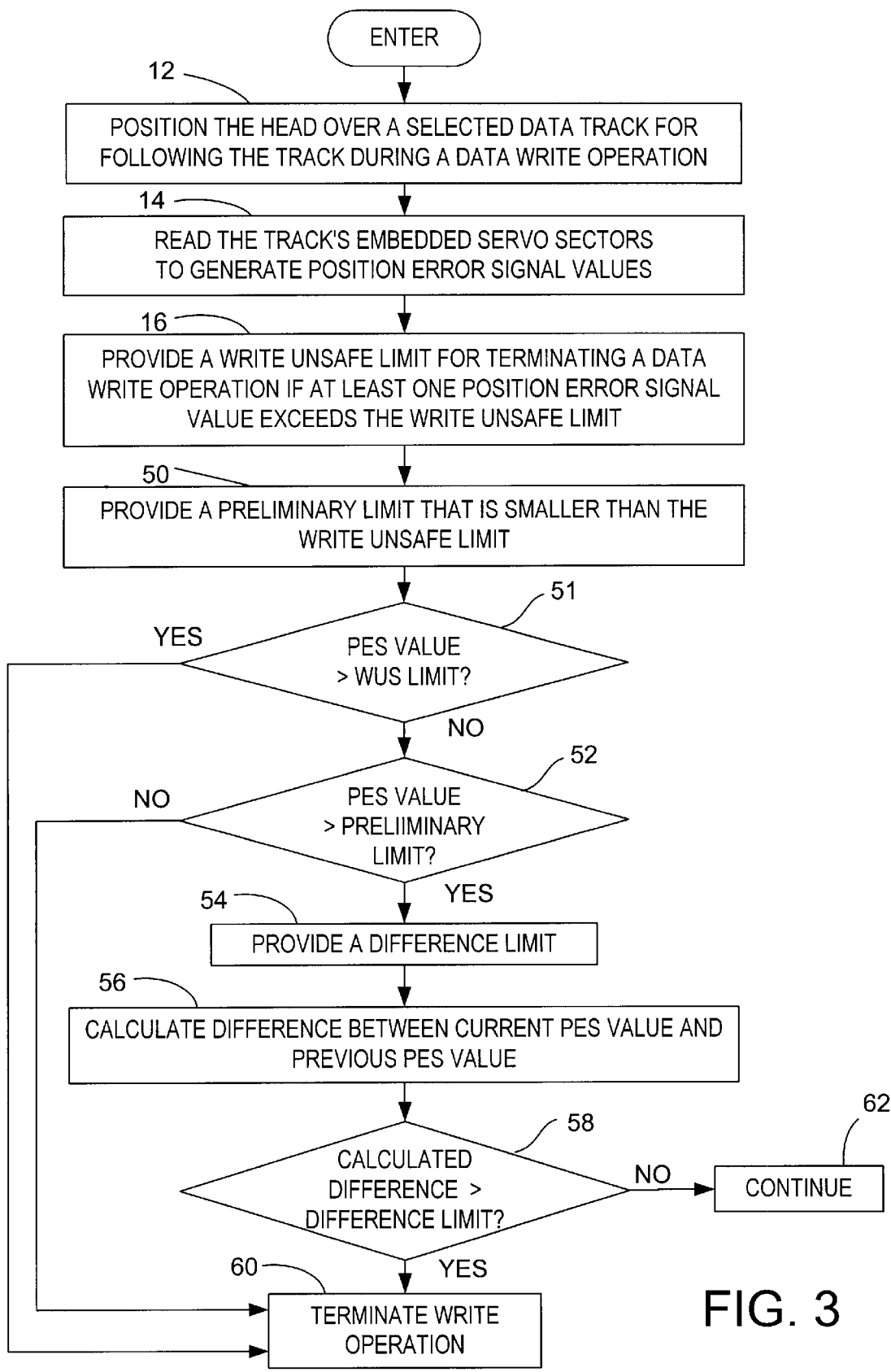
FIG. 3 is a flow diagram of a second embodiment of a method for shock estimation and write termination control in a disk drive, according to the present invention.
Figure 4:
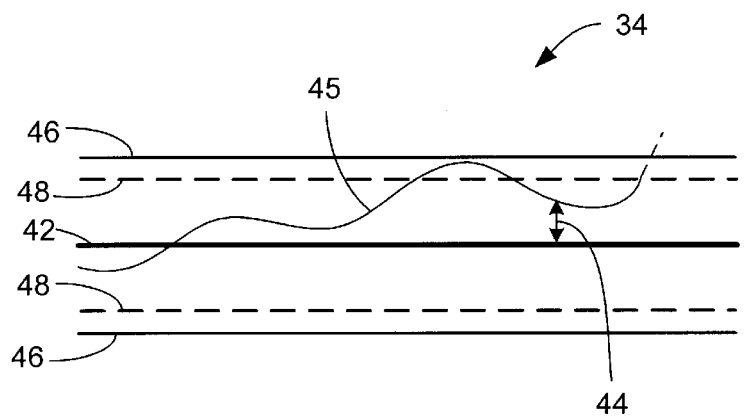
FIG. 4 is a schematic diagram of a data track showing a write unsafe limit and a preliminary limit, according to the present invention.

With reference to FIGS. 1 and 2, the present invention may be embodied in a method for shock estimation and write termination control in a disk drive 10 having a read/write head 32 and a plurality of concentric data tracks 34 on a storage surface of a rotating disk 36, each data track having data sectors 38 and embedded servo sectors 40. In the method, the head is positioned over a selected data track of the plurality of concentric data tracks for following the track during a data write operation (step 12). The track's embedded servo sectors are read to generate position error signal (PES) values (step 14). A write unsafe (WUS) limit is provided for terminating a data write operation if at least one position error signal value exceeds the write unsafe limit (step 16). A shock event limit is provided (step 18), and if a current position error signal value is less than the write unsafe limit value (step 20), then a function value is calculated based on the current position error signal value and a previous position error signal value (step 22). If the calculated function value exceeds the shock event limit (step 24), a data write operation is terminated (step 26). Otherwise, the operation is continued (step 28).

The calculated function value may be an addition of the current PES value and the previous PES value, or the calculated function value may be equal to twice the current PES value minus the previous PES value.

The shock estimation and write termination control technique involves a performance trade off between data transfer rate and data loss due to a shock event. When the WUS limit is exceeded, the current write operation is terminated and the disk drive 10 must wait a complete disk rotation in order to continue writing to the targeted data storage locations thus impacting the data transfer rate. If the disk drive is in an environment subject to external vibration, then the impact to the data transfer rate may become unacceptable. An increased WUS limit may improve the data transfer rate in a vibration environment. However, increasing the WUS limit increases the possibility of data loss due to a shock event.

The shock event limit may be empirically set to minimize data loss while providing an acceptable data transfer rate. Because the shock event limit will terminate a data write operation before the WUS limit is reached, the data transfer performance of the disk drive is affected. To set the shock event limit, an acceptable degradation level in the data transfer rate is selected, e.g., 1% or 2%. Then, simulations may be performed on data streams of representative PES values for the subject disk drive while adjustments are made to the shock event limit. The shock event limit is selected when the desired data transfer performance for the disk drive is obtained.

Figure 5A:
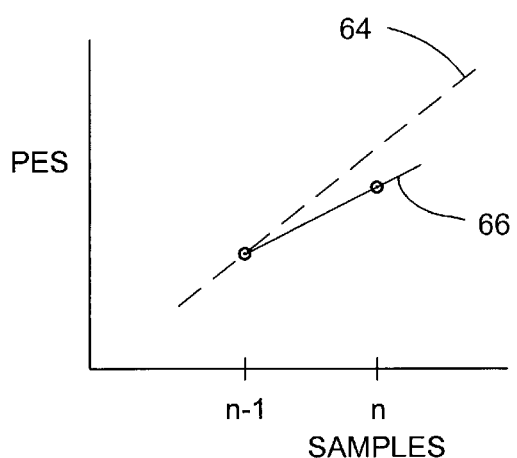
FIG. 5A is a graph diagram showing a difference limit and a calculated difference value.
Figure 5B:
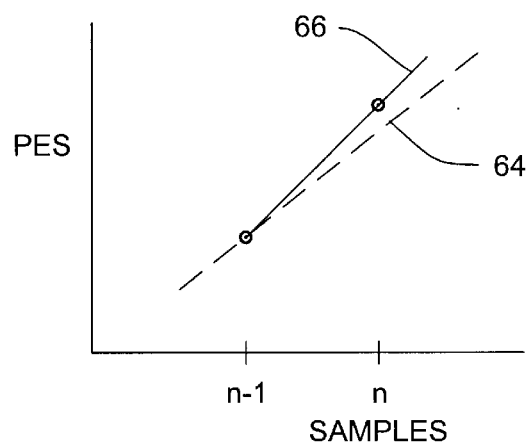
FIG. 5B is a graph diagram showing a difference limit and a calculated difference value.

With reference to FIGS. 3, 4, 5A and 5B, the invention may be embodied in another technique for shock estimation and write termination control. As before, a data track 42 (FIG. 4) is selected, PES values 44 are generated during a track following operation 45, and a WUS limit 46 is provided (steps 12, 14, and 16). In this embodiment, a preliminary limit 48 is provided that is smaller than the write unsafe limit (step 50). If at least one PES value exceeds the preliminary limit without exceeding the write unsafe limit (steps 51 and 52), then a difference limit 64 (FIGS. 5A and 5B) is provided (step 54) and a difference 66 is calculated between a current PES value and a previous PES value (step 56). If the calculated difference exceeds the difference limit (step 58) as shown in FIG. 5B, then a data write operation is terminated (step 60). Otherwise, the operation is continued (step 62). The preliminary limit and the difference limit may be empirically derived based on a desired data transfer performance as discussed before.

Figure 6:
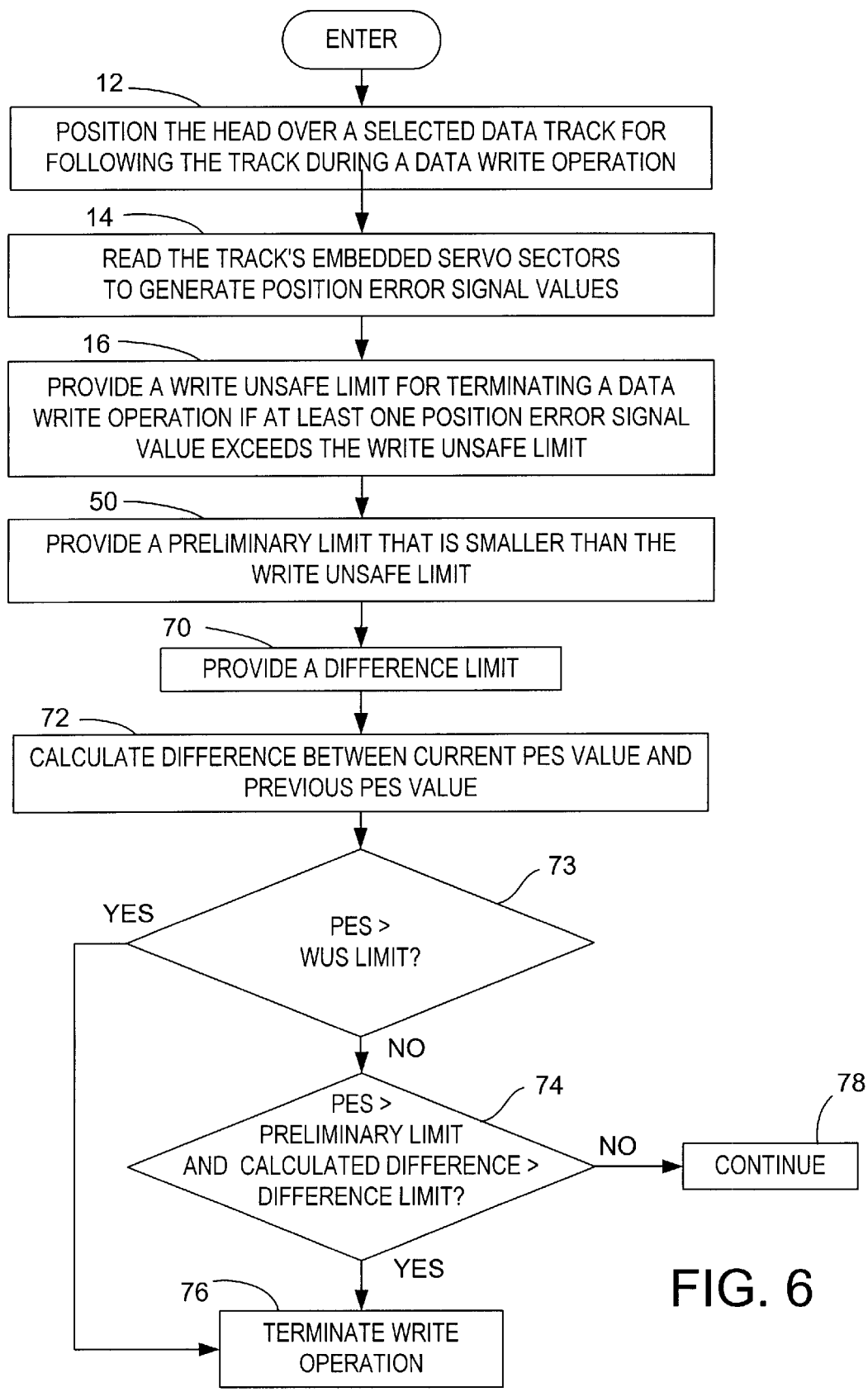
FIG. 6 is a flow diagram of a third embodiment of a method for shock estimation and write termination control in a disk drive, according to the present invention.

With further reference to FIG. 6, the invention may be embodied in another technique for shock estimation and write termination control. As before, a data track 42 is selected, PES values 44 are generated during a track following operation 45, and a WUS limit 46 and a preliminary limit 48 are provided (steps 12, 14, 16 and 50). In this embodiment, a difference limit 64 is provided (step 70). A difference 66 is calculated between a current PES value and a previous PES value (step 72). A data write operation is terminated (step 76) if the current PES value exceeds the WUS limit (step 73) or the current PES value exceeds the preliminary limit and the calculated difference exceeds the difference limit (step 74). Otherwise, the operation is continued (step 78).

The techniques for shock estimation and write termination control may be implemented in a disk drive 10 having a programmable microprocessor. A shown in FIG. 2, the disk drive 10 may include a disk control system 80 and a head disk assembly (HDA) 82. The HDA includes one or more magnetic disks 36 having a disk media with the plurality of concentric tracks 34 recorded thereon, the head 32 for writing user data to or reading user data from a selected one of the tracks in response to a host command during operation of the disk drive, and an actuator 84 for positioning the head over the selected track. The head in present disk drives is a giant magneto-resistive (GMR) read element and a thin film inductive write element. The actuator is typically implemented as a voice coil motor (VCM) which rotates an actuator arm 86 about a pivot 88 in order to position the head radially over the disk in response to control signals from the disk control system. The HDA includes a preamplifier 90, a spindle motor 92 for rotating the disk, and a ramp 94 for parking the actuator arm and head when the disk drive is in a spin-down mode. The head communicates with the disk control system via the preamplifier. The preamplifier provides an amplified signal to a read/write channel 96 of disk control system.

The disk control system 80 implements a servo control loop which causes the head 32 to follow a centerline of a selected track in an operation generally referred to as "track following." A servo processor 98 commands a servo controller 100 to control the position of the head over a target track for subsequent execution of read or write commands. The servo processor receives a representative form of a position signal sensed by the head, via the preamplifier 90 and the read/write channel 96, and performs calculations to calculate a position error signal. The servo controller responds to digital commands from the servo processor responsive to the position error signal to provide a corresponding analog signal to the VCM. The servo processor also provides commands to the servo controller to maintain a substantially constant operational rotational velocity of the spindle motor 92.

A read gate RG and a write gate WG are electrically coupled between the servo controller 100 and read/write channel 96. The read gate RG must be asserted for reading of data from a disk surface through the read/write channel. Similarly, the write gate WG must be asserted before writing of data occurs on a disk surface through the read/write channel. A servo gate signal SG is enabled when reading servo data from a servo sector located on a disk surface. The servo controller will prohibit writing by not enabling the write gate WG when a PES value exceeds the WUS limit.

The disk control system 80 also includes circuitry and processors that provide an intelligent disk control system interface between a host processor 102 and the HDA 82 for execution of read and write commands. The disk control system includes an integrated circuit host interface and disk controller (HIDC) 104 having a host interface 106, a buffer controller 108 and a disk controller 110. The host interface 106 communicates with the host processor. The buffer controller controls a buffer memory 112 employed for storing data from the host processor that is to be written to the disk 36 and for storing data read from the disk. The disk controller sends data to and receives data from the read/write channel 96 and provides for error correction and error detection on data read from the disk. An interface processor 114 handles the flow of data commands received by the host interface by sending commands to and reading status from the disk controller. The interface processor and the servo processor 98 may be advantageously implemented using a single processor of sufficient processing power. Information may be stored in nonvolatile memory 116 or in random access memory (RAM) 118 such as dynamic RAM (DRAM).

The method steps (FIGS. 1, 3 and 6) of the invention may be implemented by the servo processor 98, the servo controller 110, and the HIDC 104. Program code for the steps may be stored in the nonvolatile memory 116 and transferred to the RAM 118 during operation for execution by the interface processor.

I claim:

1. In a disk drive having a read/write head and a plurality of concentric data tracks on a storage surface of a rotating disk, each data track having data sectors and embedded servo sectors, a method for shock estimation and write termination control comprising steps for:

positioning the head over a selected data track of the plurality of concentric data tracks for following the track during a data write operation;

reading the track's embedded servo sectors to generate position error signal values;

providing a write unsafe limit for terminating a data write operation if at least one position error signal value exceeds the write unsafe limit;

providing a shock event limit; and
if a current position error signal value is less than the write unsafe limit value, then:
    calculating a function value based on the current position error signal value and a previous position error signal value;
    terminating a data write operation if the calculated function value exceeds the shock event limit.

2. A method for shock estimation and write termination control as defined in claim 1, wherein the calculated function value is an addition of the current position error signal value and the previous position error signal value.

3. A method for shock estimation and write termination control as defined in claim 1, wherein the calculated function value is equal to twice the current position error signal value minus the previous position error signal value.

4. A method for shock estimation and write termination control as defined in claim 1, wherein the calculated function value is based on the current position error signal value and an immediately previous position error signal value.

5. A method for shock estimation and write termination control as defined in claim 1, wherein the calculated function value is based only on the current position error signal value and an immediately previous position error signal value.

6. A method for shock estimation and write termination control as defined in claim 1, wherein terminating a write operation includes waiting one rotation of the disk.

7. In a disk drive having a read/write head and a plurality of concentric data tracks on a storage surface of a rotating disk, each data track having data sectors and embedded servo sectors, a method for shock estimation and write termination control comprising steps for:
    positioning the head over a selected data track of the plurality of concentric data tracks for following the track during a data write operation;
    reading the track's embedded servo sectors to generate position error signal values;
    providing a write unsafe limit for terminating a data write operation if at least one position error signal value exceeds the write unsafe limit;
    providing a preliminary limit that is smaller than the write unsafe limit; and
    if at least one position error signal value exceeds the preliminary limit without exceeding the write unsafe limit, then:
        providing a difference limit;
        calculating a difference between a current position error signal value and a previous position error signal value; and
        terminating a data write operation if the calculated difference exceeds the difference limit.

8. In a disk drive having a read/write head and a plurality of concentric data tracks on a storage surface of a rotating disk, each data track having data sectors and embedded servo sectors, a method for shock estimation and write termination control comprising steps for:
    positioning the head over a selected data track of the plurality of concentric data tracks for following the track during a data write operation;
    reading the track's embedded servo sectors to generate position error signal values;
    providing a write unsafe limit for terminating a data write operation if at least one position error signal value exceeds the write unsafe limit;
    providing a preliminary limit that is smaller than the write unsafe limit;
    providing a difference limit;
    calculating a difference between a current position error signal value and a previous position error signal value;
    terminating a data write operation if the current position error signal value exceeds the preliminary limit and the calculated difference exceeds the difference limit.

9. A disk drive for estimating shock and controlling write termination, comprising:
    a read/write head;
    a plurality of concentric data tracks on a storage surface of a rotating disk, each data track having data sectors and embedded servo sectors;
    means for positioning the head over a selected data track of the plurality of concentric data tracks for following the track during a data write operation;
    means for reading the track's embedded servo sectors to generate position error signal values;
    means for providing a write unsafe limit for terminating a data write operation if at least one position error signal value exceeds the write unsafe limit;
    means for providing a shock event limit; and
    means for calculating a function value based on a current position error signal value and a previous position error signal value if the current position error signal value is less than the write unsafe limit value, and terminating a data write operation if the calculated function value exceeds the shock event limit.

10. A disk drive for estimating shock and controlling write termination as defined in claim 9, wherein the calculated function value is an addition of the current position error signal value and the previous position error signal value.

11. A disk drive for estimating shock and controlling write termination as defined in claim 9, wherein the calculated function value is equal to twice the current position error signal value minus the previous position error signal value.

12. A disk drive for estimating shock and controlling write termination as defined in claim 9, wherein the calculated function value is based on the current position error signal value and an immediately previous position error signal value.

13. A disk drive for estimating shock and controlling write termination as defined in claim 9, wherein the calculated function value is based only on the current position error signal value and an immediately previous position error signal value.

14. A disk drive for estimating shock and controlling write termination as defined in claim 9, wherein terminating a write operation includes waiting one rotation of the disk.

15. A disk drive for estimating shock and controlling write termination, comprising:
    a read/write head;
    a plurality of concentric data tracks on a storage surface of a rotating disk, each data track having data sectors and embedded servo sectors;
    means for positioning the head over a selected data track of the plurality of concentric data tracks for following the track during a data write operation;
    means for reading the track's embedded servo sectors to generate position error signal values;
    means for providing a write unsafe limit for terminating a data write operation if at least one position error signal value exceeds the write unsafe limit;
    means for providing a preliminary limit that is smaller than the write unsafe limit;

means for providing a difference limit and calculating a difference between a current position error signal value and a previous position error signal value if at least one position error signal value exceeds the preliminary limit without exceeding the write unsafe limit; and means for terminating a data write operation if the calculated difference exceeds the difference limit.

16. A disk drive for estimating shock and controlling write termination, comprising:

a read/write head;

a plurality of concentric data tracks on a storage surface of a rotating disk, each data track having data sectors and embedded servo sectors;

means for positioning the head over a selected data track of the plurality of concentric data tracks for following the track during a data write operation;

means for reading the track's embedded servo sectors to generate position error signal values;

means for providing a write unsafe limit for terminating a data write operation if at least one position error signal value exceeds the write unsafe limit;

means for providing a preliminary limit that is smaller than the write unsafe limit;

means for providing a difference limit;

means for calculating a difference between a current position error signal value and a previous position error signal value;

means for terminating a data write operation if the current position error signal value exceeds the preliminary limit and the calculated difference exceeds the difference limit.

* * * * *